United States Patent [19]

Mattera et al.

[11] 4,009,396
[45] Feb. 22, 1977

[54] WAVE OPERATED POWER PLANT

[76] Inventors: Henry A. Mattera, 736 Fern St., Yeadon, Pa. 19050; Paul F. Pitts; Marlene M. Pitts, both of 245 Merion Ave., Aldan, Pa. 19018

[22] Filed: Nov. 19, 1975

[21] Appl. No.: 633,397

[52] U.S. Cl. .................................. 290/53; 290/42
[51] Int. Cl.$^2$ ........................................ F03B 13/12
[58] Field of Search ................. 290/42, 43, 53, 54; 417/331, 332

[56] References Cited

UNITED STATES PATENTS

| 656,645 | 8/1900 | Hoff | 417/331 X |
| 2,871,790 | 2/1959 | Weills | 290/42 X |
| 3,064,137 | 11/1962 | Corbett et al. | 290/53 |
| 3,200,255 | 8/1965 | Masuda | 290/42 |
| 3,870,893 | 3/1975 | Mattera | 290/53 |
| 3,912,938 | 10/1975 | Filipenco | 290/53 |

*Primary Examiner*—Gene Z. Rubinson
*Assistant Examiner*—W. E. Duncanson, Jr.
*Attorney, Agent, or Firm*—Z. T. Wobensmith, 2nd; Z. T. Wobensmith, III

[57] ABSTRACT

A wave operated power plant is provided wherein a buoyant vessel is anchored on the ocean surface with the wave motion causing displacement of water carried in a chamber in the hull such that upon rocking motion the water is forced upwardly through pipes on one side of the vessel. The water contacts turbine blades which through shafts rotate electrical generators and generate electricity. The water is returned to the chamber when the vessel moves in the opposite direction and the cycle is repeated with water forced up through pipes in the other side of the vessel, used for electrical generation and then returned to the chamber. The water being forced up from the chamber can contact the blades directly or be stored in a tank on top of the vessel and released at a predetermined rate.

4 Claims, 4 Drawing Figures

WAVE OPERATED POWER PLANT

BACKGROUND OF THE INVENTION

1. Field of the Invention

This invention relates to power plants in which impelling of water carried within a buoyant vessel by wave motion, through pipes is used to rotate blades to drive electric generators and produce electricity.

2. Description of the Prior Art

The use of wave motion for generation of electricity has been experimented with by many persons over a long period of time.

The U.S. Patent to Corbett, Jr., et al. No. 3,064,137, illustrates a buoy including a plenum chamber with wave motion causing air to flow therefrom through a standpipe rotating blades and operating a generator.

The U.S. Patent to Masuda, No. 3,200,255, illustrates a buoy that is anchored offshore with an air pipe connected to open air through the vanes of a turbine and to an air pump room. The force of the waves causes the buoy to ride up and down thereby compressing air in the pump room and rotating the turbine blade to drive an electric generator.

These previously available structures use air as an impelling medium which medium is unsatisfactory due to losses in compression and the forces needed to compress the air need to be of large magnitude.

In my prior U.S. Pat. No. 3,870,893 wave motion causes water to be drawn into a buoyant vessel to drive blades and shafts attached to electrical generators, the water then being discharged back into the sea. While such structure is satisfactory it is desirable to provide a closed system wherein the water is retained within the vessel and reused. None of the available prior art structures contemplates my closed system structure.

SUMMARY OF THE INVENTION

In accordance with the invention a wave operated power plant is provided wherein the wave rocking movement of a buoyant vessel causes water within a chamber in the vessel to be forced through pipes carried in the vessel to cause blades to rotate shafts of electric generators and thereby generate electricity.

The principal object of the invention is to provide a wave operated power plant which is simple to construct and is completely self-contained.

A further object of the invention is to provide a wave operated power plant that can be utilized in any ocean in the world and in all types of weather.

A further object of the invention is to provide a wave operated power plant that can be equipped with a water storage tank or not as desired for controlled water discharge to operate the generators.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

Figure 1:
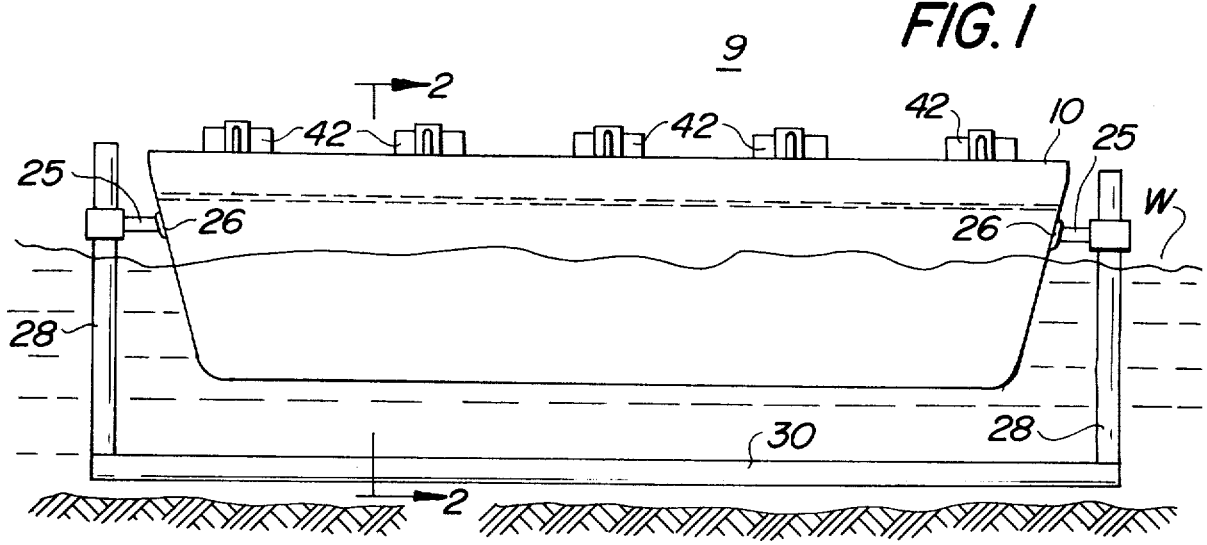
FIG. 1 is a side elevational view of a vessel incorporating the apparatus of our invention.
Figure 2:
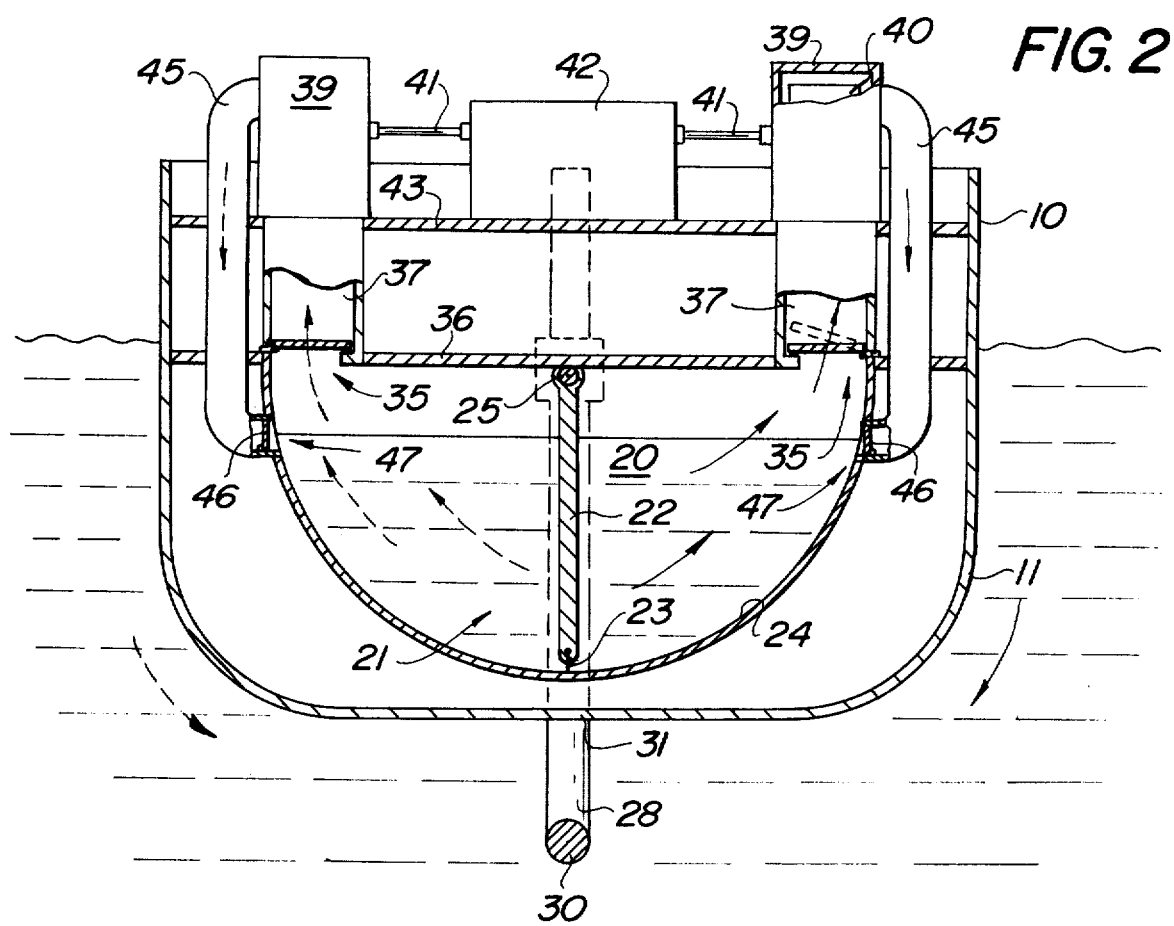
FIG. 2 is a vertical sectional view, enlarged, taken approximately on the line 2—2 of FIG. 1.
Figure 3:
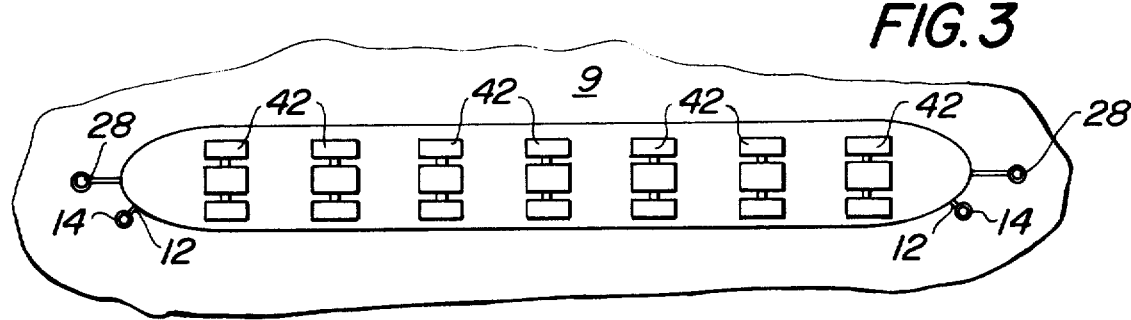
FIG. 3 is a top plan view of the vessel of FIG. 1 on a reduced scale.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawings, the wave operated power plant includes a buoyant vessel 9 having a hull 10 of conventional shape provided with an outer watertight skin 11. The vessel hull 10 is shown as floating on a body of water subject to substantially continuous wave motion, preferably ocean water shown with a water line W on the hull 10. The vessel 9 is anchored by lines 12 to piles 14 driven into the ocean floor or into a reef so that it will react to wave motion.

The hull 10 is provided with a watertight chamber 20 which may run substantially the length of the vessel 9 and between the sides of the vessel 9.

The chamber 20 has liquid 21 therein which may be water or other suitable liquid of a volume determined by the size of the vessel 9 and the desired displacement of liquid to operate the apparatus as described below.

Within the chamber 20 and running its length a sweep 22 is provided which has seal 23 bearing on the wall 24 of the chamber 20. The sweep 22 is rotatably mounted within the vessel hull 10 by a shaft 25 which extends the length of the vessel 9 and beyond the hull and is carried in bearings 26 at the bow and stern of the vessel 9. Shafts 28 are attached to the shaft 25 and have a weight 30 connected therebetween.

In a preferred embodiment the vessel 9 can be of a length of approximately 400 ft. with a beam of approximately 30 foot. The weight 30 is preferably located approximately 25 foot below the keel 31 of the vessel 9 and of a weight approximately one-sixth the weight of the buoyant vessel 9 and apparatus therein. The vessel 9 can be moored to have approximately 40 foot of water underneath its keel 31 and located about one-half mile from the shore and broadside to the direction of the waves which should provide optimum wave action.

The chamber 20 is provided with water outlet openings 35 at spaced locations in its top cover 36. The outlet openings 35 communicate with pipes 37 and are provided with one way flaps or valves 38 which permits water to flow up into pipes 36 but close and resist downward water flow. The pipes 37 are connected to housings 39 which have turbine blades 40 mounted therein on shafts 41 which extend to electrical generators 42 of well known type mounted on the deck 43 of hull 10. Pipes 45 are connected to the housings 38 and to the chamber 20 with one way flaps or valves 46 therein at outlet openings 47 adjacent chamber 20 to permit water to be returned thereto.

Figure 4:
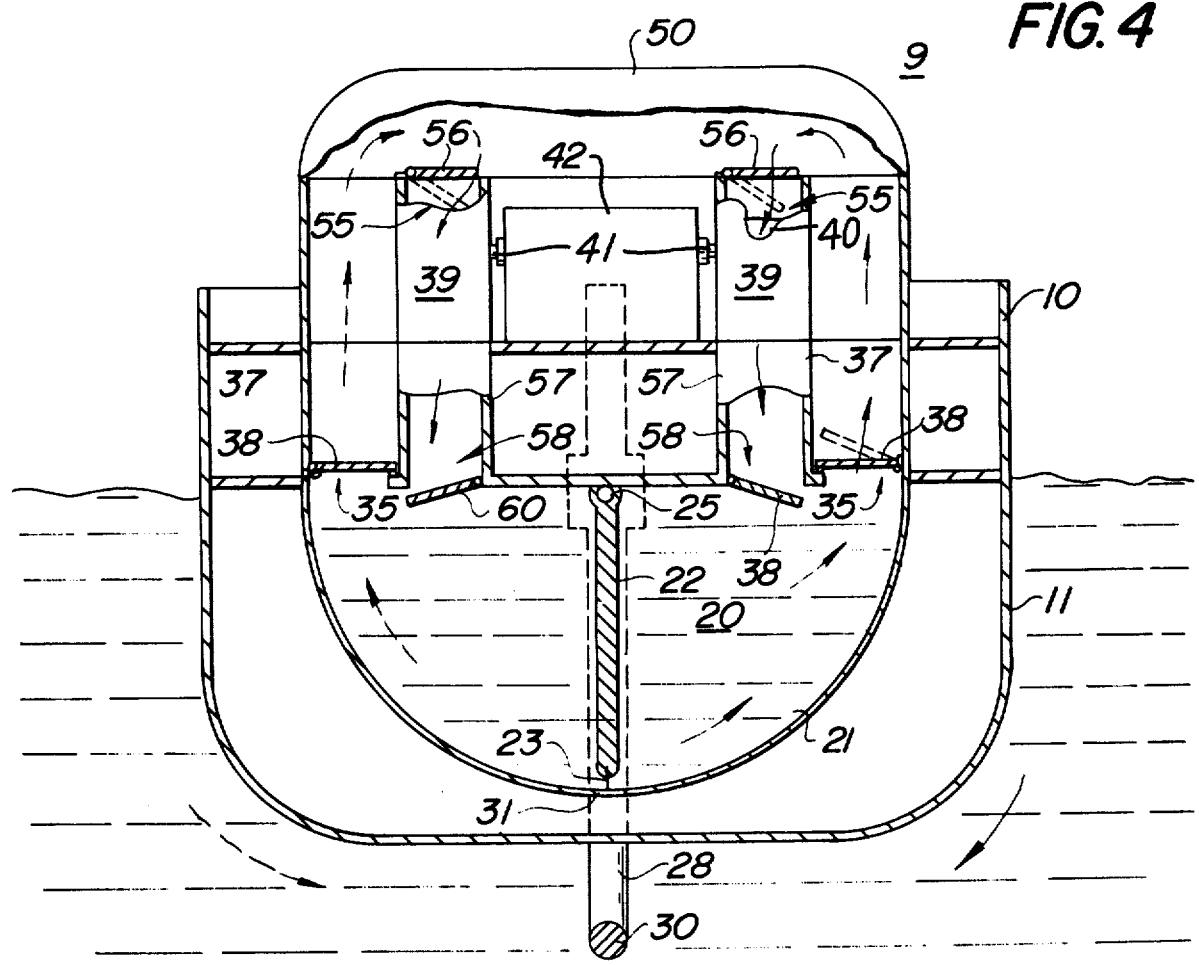
FIG. 4 is a view similar to FIG. 2 but illustrating the vessel with a storage tank thereon.

If desired, for installation wherein a controlled steady discharge of water is desired, a tank 50 can be provided as illustrated in FIG. 4 and straddling the generators 42 which is of conventional type and can operate as a reserve tank or as a pressure tank.

The pipes 37 are connected directly to the tank 50 which has outlet openings 55 communicating with housings 39 and with adjustable valves 56 to control water discharge thereto. The housings 39 would have water return pipes 57 connected thereto and to the tank 50 with outlet openings 58 and one way flaps or valves 60.

In operation the hull 10 of the vessel 9 is rocked by waves pushing against the sides. The weight 30 tends to resist any rocking motion due to the forces of gravity but may rise vertically. The hull 10 is rotated about the shaft 25 by the wave motion which causes the sweep 22 to move up one side of chamber 20 and force water out through pipes 37 on one side, up and against the turbine blades 40 or into the tank 50 from which it is released as desired. The blades 40 rotate the shafts 41 and cause the generators 42 to produce electricity. The water returns to the chamber 20 via pipes 45 as the hull 10 rocks in the opposite direction sending water out the pipes 37 on the opposite side with operation as previously described.

If it is desired to provide controlled liquid discharge to the housing 39, then the structure of FIG. 4 is utilized in which liquid is forced through pipes 37 as described above tending to fill tank 50 which is released to housings 39 through outlet openings 55 and valves 56. The liquid comes against blades 40 which rotates the shafts 41 and causes the generators 42 to produce electricity. The liquid returns from housings 39 through pipes 57, openings 58, and valves 60 into the tank 50 with like action as the boat rocks in the opposite direction.

It will thus be seen that a wave operated power plant has been provided with which the objects of the invention are achieved.

I claim:
1. A wave operated power plant which comprises a vessel having a hull
   a chamber carried within said hull, and having a quantity of liquid therein,
   a vertically extending pipe extending upwardly from the top of said chamber for liquid delivery,
   liquid actuated motive power means to which said pipe is connected,
   a return pipe connected to said motive power means for the return of the liquid to said chamber,
   electric generator means driven by said motive power means,
   a sweep rotatably mounted within said chamber by a shaft extending the length of said vessel, which sweep forces the water into said pipes by motion of said vessel, and
   weight means carried by said shaft under said vessel.
2. A wave operated power plant as defined in claim 1 in which
   said delivery pipe has a one way valve therein permitting water to flow upwardly from said chamber.
3. A wave operated power plant as defined in claim 1 in which
   a one way valve is provided in said return pipe permitting water to flow down into said chamber.
4. A wave operated power plant as defined in claim 1 in which
   a tank is interposed between said liquid delivery pipe and said motive power means, and
   valve means is provided for regulating the delivery of liquid from said tank to said motive power means.

* * * * *